United States Patent [19]

Matsutani

[11] 4,413,746
[45] Nov. 8, 1983

[54] PRESSURIZED-FLUID CARTRIDGE AND SAFETY CLOSURE THEREFOR

[75] Inventor: Yoshihide Matsutani, Fujisawa, Japan

[73] Assignee: Miyata Industry Co., Ltd., Chigasaki, Japan

[21] Appl. No.: 347,725

[22] Filed: Feb. 10, 1982

[30] Foreign Application Priority Data

Apr. 10, 1981 [JP] Japan .............................. 56-52022[U]

[51] Int. Cl.³ ............................................. B65D 90/34
[52] U.S. Cl. ................................... 220/89 A; 220/207; 220/265; 220/364; 222/397
[58] Field of Search ................. 220/89 A, 3, 359, 364, 220/365, 207, 265, 277, 367, 360–363, DIG. 3; 222/5, 396, 397; 137/68 R; 215/260

[56] References Cited

U.S. PATENT DOCUMENTS

| | | | |
|---|---|---|---|
| 2,326,771 | 8/1943 | Eidson | 220/89 A X |
| 2,492,883 | 12/1949 | O'Neil | 220/364 |
| 2,726,022 | 12/1955 | Dalianis . | |
| 3,038,627 | 6/1962 | Daley | 215/1 R |
| 3,039,646 | 6/1962 | Merz . | |
| 3,372,839 | 3/1968 | Hayes | 222/396 X |
| 3,622,051 | 11/1971 | Benson | 220/89 A |
| 3,827,449 | 8/1974 | Gurizzan et al. | 222/397 X |
| 4,219,126 | 8/1980 | Oana | 220/89 A |
| 4,260,075 | 4/1981 | Mackal | 222/5 |

FOREIGN PATENT DOCUMENTS

| | | | |
|---|---|---|---|
| 405414 | 8/1943 | Italy | 220/367 |
| 15-30929 | 10/1940 | Japan . | |
| 54-106511 | 7/1979 | Japan . | |
| 54-106512 | 7/1979 | Japan . | |
| 54-106513 | 7/1979 | Japan . | |
| 56-34240 | 8/1981 | Japan . | |
| 193353 | 2/1923 | United Kingdom | 220/367 |
| 792381 | 3/1958 | United Kingdom | 222/5 |
| 770961 | 3/1967 | United Kingdom | 220/367 |

Primary Examiner—William Price
Assistant Examiner—Gary E. Elkins
Attorney, Agent, or Firm—Wegner & Bretschneider

[57] ABSTRACT

A high-pressure gas cartridge is formed by a metallic container (11) having a neck portion (11a) defining a mouth, a safety closure (12) sealingly closing the mouth, and a quantity of fluid under pressure stored in the container. The closure (12) comprises an inner base layer (14) of a metal formed therein with a pressure relief through-hole (13) and welded to the container neck portion (11a) around the mouth, an outer layer (16) of a corrosion-resistant metal thinner than the inner base layer and an intermediate layer of solder (15) sandwiched between the inner and outer layers (14 and 16) to sealingly secure them together so that the pressure relief through-hole (13) is closed by the thinner outer layer (16). The part of the outer layer (16) facing the pressure relief through-hole (13) is rupturable when the gaseous pressure in the cartridge is raised to an unduly high level.

15 Claims, 2 Drawing Figures

PRESSURIZED-FLUID CARTRIDGE AND SAFETY CLOSURE THEREFOR

BACKGROUND OF THE INVENTION

1. Field of the Invention

The present invention relates to a pressurized-fluid cartridge useful for a variety of domestic purposes, such as for discharging draft beer from a beer dispenser or expelling soda water from a soda siphon. More particularly, the present invention is concerned with a safety closure used to close the mouth of such high-pressure container.

2. Description of the Prior Art

It has been known that, when the pressure in such a cartridge or high-pressure container is raised to an unduly high level by the increase in the ambient temperature caused as in an occasion where the cartridge, which has not yet been used, is inadvertently put into a fire, the closure having a wall thickness smaller than that of the container portion of the cartridge is outwardly bowed until the closure everts and explodes, so that the gas under pressure is jetted through the ruptured opening in the closure to propell and leap the cartridge at a dangerously high velocity and in an uncertain direction.

In an attempt to eliminate such dangerous conditions, it has been proposed in U.S. Pat. No. 3,038,627 to provide a thin-walled area or zone at a localized portion of a pressure container so that, when the pressure within the container is raised to an unduly high level, a small hole is formed in the thin-walled zone of the container to permit the pressure to be relieved through the small hole at a low rate for thereby preventing the container from otherwise being strongly propelled to leap at a dangerously high velocity. It has also been proposed in U.S. Pat. No. 4,219,126 to provide a thin-walled portion in a closure sealed to the mouth of a high-pressure gas container.

The prior art high-pressure gas containers, including those disclosed in the U.S. patents referred to above, are usually made from mild steel from the view points of workability and cost of manufacture. Although the containers are plated or coated with paint so as to guard the containers against corrosion, the localized thin-walled portions provided in the containers or in the closures are attacked by water contained either in the pressurized gases in the containers or in the atmospheric air. Thus, the thin-walled portions tend to be corroded in a long time until pin holes are formed to permit gaseous pressures to escape therethrough during storage of the containers or cartridges.

Particularly, the gas cartridge disclosed and claimed in U.S. Pat. No. 4,219,126 is provided with a conical recess formed in the central section of the closure of the container. The design of the recess calls for very strict dimensional relationship between the area of the opening of the recess in the closure and the wall thickness of the recessed or thinned section of the closure. It has been known from experimental tests that the wall thickness of the thinnest part of the closure, i.e., the wall thickness at the bottom of the conical recess in the closure, must be not greater than 0.08 mm in order to assure that the closure can surely act as a safety closure. If the wall thickness is greater than 0.08 mm, there occurs a very dangerous possibility that the closure is bursted widely beyond the recessed section of the closure toward the outer peripheral edge thereof. In order to avoid such a dangerous possibility, therefore, the wall thickness of the thinnest point of the recessed section of the closure must normally be about 0.05 mm.

However, very minute technique and skill are required to provide the cartridge closures with recesses which satisfy the above-discussed dimensional requirement. In addition, it is impossible to visibly judge if recessed cartridge closures so made would surely satisfy the requirement for safety closures.

In addition, because the prior art cartridge closures are usually made of a metal, such as mild steel, so that the closures can be welded to the cartridge bodies or containers which are made from mild steel, as pointed out previously, it will be appreciated that the closures are easily corroded by the water contained in the pressurized gases in the cartridges or in the atmospheric air. Thus, pin holes are formed by corrosion in the thin-walled points of the bottoms of the recesses in the cartridge closures in comparatively short time from the manufacture of the cartridges, so that gaseous contents of the cartridges all escape therefrom during storage of the cartridges. Moreover, because the closures of the prior art gas cartridges are each formed by a single layer of metal, the closure metal layer will widely evert and explode from the thinnest point of the metal layer to form a wide opening when the gaseous pressure in the cartridge is raised to an unduly high level. Thus, the gas at the high pressure rushes out of the exploded cartridge through the exploded opening in the closure to propell and leap the cartridge at a very dangerously high velocity.

SUMMARY OF THE INVENTION

The present invention has an object to solve the problems discussed above.

It is another object of the present invention to provide improved safety closures for pressurized-fluid cartridges which provide accurately controlled wall thicknesses to enable the closures to act as reliably safety closures and which have improved corrosion-resistant properties to assure storage of cartridges for prolonged time period.

It is a further object of the present invention to provide pressurized-fluid cartridges provided with closures having improvements discussed above.

According to one feature of the invention, there is provided a safety closure used to close the mouth of a metallic container of cartridge type for storing a fluid under pressure, said closure being formed by a laminated structure comprising a first layer of a first metal adapted to be welded to said container around said mouth, a second solid layer of a second metal having a corrosion-resistant property, said first layer having a thickness greater than that of said second layer and provided with at least one pressure relief through-hole formed therein, and means disposed between said first and second layers for sealingly securing said layers together at least around said through-hole so that said pressure relief through-hole is closed by said second layer, the portion of said second layer facing said pressure relief through-hole being rupturable when the pressure in said cartridge is raised to an unduly high level.

According to another feature of the invention, there is provided a safe pressurized-fluid cartridge comprising a metallic container having a neck portion providing a mouth, a safety closure sealingly closing said mouth of said container, and a quantity of fluid under pressure stored in said container, said closure being formed by a laminated stucture comprising a first layer of a first metal welded to said neck portion of said container around said mouth, a second solid layer of a second metal having a corrosion-resistant property, said first layer having a thickness greater than that of said second layer and provided with at least one pressure relief through-hole formed therein, and means disposed between said first and second layers for sealingly securing said layers together at least around said through-hole so that said through-hole is closed by said second layer, the portion of said second layer facing said pressure relief through-hole being rupturable when the pressure in said container is raised to an unduly high level.

The second metal may preferably be a stainless steel. The sealingly securing means may preferably comprise a layer of copper solder extending between the first and second layers across substantially entire areas thereof. The first metal may preferably be a steel. The second layer may preferably have an area substantially equal to that of the first layer. The pressure relief through-hole may preferably have a substantially cylindrical inner peripheral surface.

The above and other objects, features and advantages of the present invention will be made apparent by the following description with reference to the accompaning drawings.

DESCRIPTION OF A PREFERRED EMBODIMENT

Figure 1:
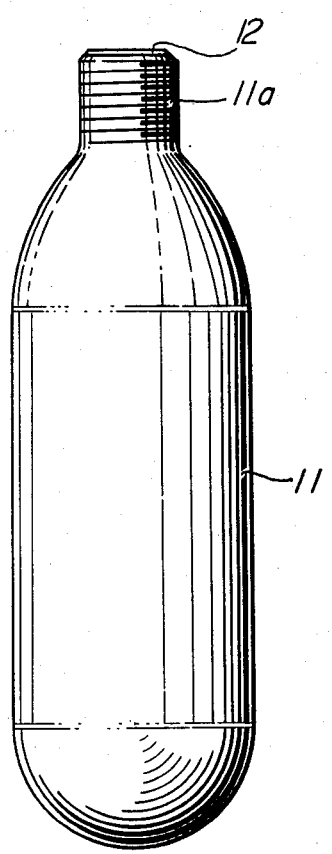
FIG. 1 is a side elevational view of an embodiment of a pressurized-fluid cartridge according to the present invention.
Figure 2:
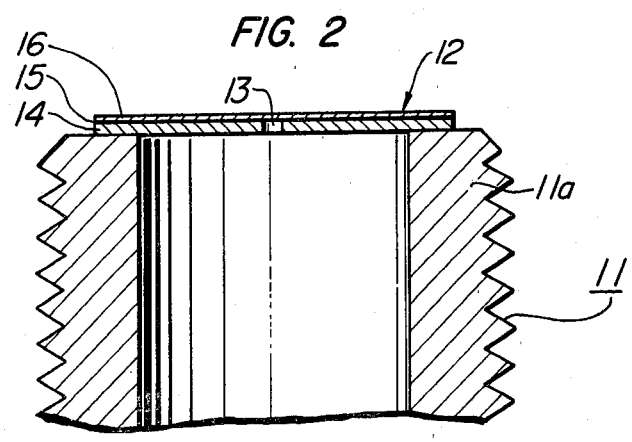
FIG. 2 is an enlarged fragmentary sectional view of the cartridge showing the structural details of the closure of the cartridge.

A pressurized-fluid cartridge shown in FIGS. 1 and 2 is designed to store a quantity of $CO_2$ gas under pressure or in liquified state and comprises a container 11 formed from mild steel and having a neck portion 11a which defines a mouth of the container 11. A substantially disc-like closure 12 is sealingly secured to the neck portion 11a around the mouth of the container 11 to seal the pressurized $CO_2$ gas in the container.

More specifically, the closure 12 is formed by a laminated structure comprising an inner base layer 14 of mild steel formed therein with a central through-hole 13, an outer layer 16 of a corrosion-resistant metal having an area substantially equal to that of the inner base layer 14 and sealingly secured to the inner layer 14 by an intermdiate layer 15 of copper solder sandwiched between the inner and outer layers 14 and 16. The intermediate solder layer 15 extends across substantially the entire areas of the inner and outer layers 14 and 16. The inner base layer 14 is welded to an annular end face of the neck portion 11a of the container 1 by projection welding. The thickness of the outer layer 16 is much smaller than that of the inner layer 14 and determined such that the portion of the outer layer 16 which faces the through-hole 13 in the inner layer 14 is ruptured by an unduly raised high gaseous pressure in the cartridge to release the pressure for thereby assuring safety of the cartridge.

In bonding the outer layer 16 to the inner base layer 14 by the copper solder 15, the through-hole 13 in the base layer 14 should not be filled with the solder in order to assure that the through-hole 13 can act as a pressure relief hole. For this purpose, when the soldering is conducted to secure the two layers together, the part of the surface of the outer layer 16 which is to be faced to the through-hole 13 in the inner layer 14 may preferably be coated with a soldering-prevention agent such as, for example, "Stop-Off" (Trade Name) manufactured by WALL COLMONOY CORPORATION, U.S.A.

The closure 12 must be easily pieced by a pin or the like to provide an egress for the contents of the cartridge when the cartridge is set in operative position. With this in mind, the inner base layer 14 of the closure 12 preferably has a thickness of from 0.3 to 0.5 mm. In addition, it has been known from experimental tests that the diameter of the pressure relief through-hole 13 should be not greater than 0.8 mm in order to assure that the closure 12 reliably acts as a safety closure for $CO_2$ gas cartridge. The through-hole 13 preferably has a substantially cylindrical inner peripheral surface.

The outer layer 16 is preferably made from a stainless steel. The use of the stainless steel layer 16 can eliminate the prior art problem of corrosion caused by the water content of either the atmospheric air or pressurized gas in the cartridge. Thus, the outer layer 16 may be made as thin as possible provided that the thickness of the layer 16 can withstand the normal pressure in the cartridge under normal temperature. More specifically, the thickness of the outer layer 16 should preferably range from 0.03 to 0.05 mm.

The structure of the safety closure 12 of the pressurized-fluid cartridge of the described embodiment provides following advantageous merits:

(1) Since the thinner outer layer 16 bonded to the inner base layer 14 is made from a corrosion-resistant metal such as a stainless steel, the thin-walled portion of the closure 12 exhibits a remarkably improved corrosion-resistant property, with a result that the thin-walled portion of the closure 12 is not corroded by the water contained in the atmospheric air or in the pressurized gas in the container. This assures that the cartridge can be stored for a prolonged time period. In addition, the determination of the thickness of the thinner outer layer 16 of the closure 12 can be entirely free from consideration of the problem of corrosion of the outer layer which would otherwise be caused by the water content of the atmospheric air.

(2) Because the closure 12 is formed by a laminated structure and the ratio of the thickness of the thinner outer layer 16 to the thickness of the thicker inner layer 14 is approximately one tenth (1/10), the wall thickness of the thin-walled portion of the closure 12 is sharply increased step-wise by the substantially cylindrical inner peripheral surface or edge of the through-hole 13. This assures that, when the gaseous pressure in the cartridge is suddenly raised to a dangerously high level, only the portion of the thinner outer layer 16 that is faced to the pressure relief through-hole 13 can be ruptured to release the pressure at a rate which is sufficiently low enough to prevent the cartridge from being dangerously leaped. In other words, the annular area of the inner layer 14 surrounding the through-hole 13 and the annular area of the outer layer 16 bonded to the said annular area of the inner layer 14 are reliably prevented from being ruptured and exploded. Thus, the pressure is not released at a rate which is sufficiently high to dangerously leap the cartridge in an uncertain direction.

Accordingly, the closure 12 can reliably act as a safety closure for a pressurized-fluid cartridge.

(3) The laminated structure of the closure 12 facilitates an easier welding of the closure to the container as compared with direct welding of a stainless steel closure to the container because, in the described embodiment of the invention, the outer stainles steel layer 16 is soldered to the inner base layer 14 of mild steel which in turn is welded to the container 11 by projection welding.

(4) The laminated structure of the closure 12 assures mass production of reliable safety cartridge closures of high quality because the wall thickness of the thinnest part of each closure can be determined solely by the thickness of the corrosion-resistant sheet metal from which the outer layer 16 of the closure is made. This is quite advantageous as compared with the prior art in which the closure is formed by a single layer of metal which is thinned by a recess formed in a localized area of the metal layer. In the prior art, it is quite difficult to form the recess in the metal layer is such a manner as to assure that the recessed portion of the metal has an accurately controlled wall thickness.

What is claimed is:

1. A safety closure used to close the mouth of a metallic container of cartridge type for storing a fluid under pressure, said closure being formed by a laminated structure comprising a first layer of a first metal adapted to be welded to said container around said mouth, a second solid layer coextensive with said first layer of a second metal having a corrosion-resistant property, said first layer having a thickness greater than that of said second layer and provided with at least one pressure relief through-hole formed therein, and means disposed between said first and second layers and coextensive with said first layer for sealingly securing said layers together so that said pressure relief trhough-hole is closed by said second layer and said sealingly securing means, the portion of said second layer facing said pressure relief through-hole being rupturable when the pressure in said container is raised to an unduly high level.

2. A safety closure according to claim 1, wherein second metal is a stainless steel.

3. A safety closure according to claim 1 or 2, wherein said sealingly securing means comprises a layer of a solder extending between said first and second layers across substantially entire areas thereof.

4. A safety closure according to claim 3, wherein said first metal is a steel and said sealingly securing means comprises a layer of copper solder.

5. A safety closure according to claim 3, wherein said first layer has a thickness of from 0.3 to 0.5 mm, said second layer has a thickness of from 0.03 to 0.05 mm and said through-hole has a diameter of not greater than 0.8 mm.

6. A safety closure according to claim 3, wherein said second layer has an area substantially equal to that of said first layer.

7. A safety closure according to claim 3, wherein said through-hole has a substantially cylindrical inner peripheral surface.

8. A safe pressurized-fluid cartridge comprising a metallic container having a neck portion providing a mouth, a safety closure sealingly closing said mouth of said container, and a quantity of fluid under pressure stored in said container, said closure being formed by a laminated structure comprising a first layer of a first metal welded to said neck portion of said container around said mouth, a second solid layer coextensive with said first layer of a second metal having a corrosion-resistant property, said first layer having a thickness greater than that of said second layer and provided with at least one pressure relief through-hole formed therein, and means disposed between said first and second layers and coextensive with said first layer for sealingly securing said layers together so that said pressure relief trhough-hole is closed by said second layer and said sealingly securing means, the portion of said second layer facing said pressure relief through-hole being rupturable when the pressure in said cartridge is raised to an unduly high level.

9. A pressurized-fluid cartridge according to claim 8, wherein said neck portion has a substantially annular outer end face which defines said mouth, and wherein said first layer of said closure is welded to said annular end face.

10. A pressurized-fluid cartridge according to claim 9, wherein said second metal is a stainless steel.

11. A pressurized-fluid cartridge according to claim 9 or 10, wherein said sealingly securing means comprises a layer of a solder extending between said first and second layers across substantially entire areas thereof.

12. A pressurized-fluid cartridge according to claim 11, wherein said first metal is a steel and said sealingly securing means comprises a layer of copper solder.

13. A pressurized-fluid cartridge according to claim 11, wherein said first layer has a thickness of from 0.3 to 0.5 mm, said second layer has a thickness of from 0.03 to 0.05 mm and said through-hole has a diameter of not greater than 0.8 mm.

14. A pressurized-fluid cartridge according to claim 11, wherein said second layer has an area substantially equal to that of said first layer.

15. A pressurized-fluid cartridge according to claim 11, wherein said through-hole has a substantially cylindrical inner peripheral surface.

* * * * *